United States Patent
Burrow et al.

(10) Patent No.: US 11,685,338 B1
(45) Date of Patent: Jun. 27, 2023

(54) PRETENSIONER HOUSING IN RETRACTOR ASSEMBLY

(71) Applicant: AUTOLIV ASP, INC., Ogden, UT (US)

(72) Inventors: Jon E. Burrow, Ortonville, MI (US); Daniel Robert Murphy, Oxford, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 17/549,425

(22) Filed: Dec. 13, 2021

(51) Int. Cl.
*B60R 22/46* (2006.01)

(52) U.S. Cl.
CPC .................. *B60R 22/4652* (2013.01)

(58) Field of Classification Search
CPC ............ B60R 22/4652; B60R 22/4642; B60R 22/4828
See application file for complete search history.

(56) References Cited

U.S. PATENT DOCUMENTS

| | | | | |
|---|---|---|---|---|
| 8,403,365 B2 * | 3/2013 | Tanaka | ............... | B60R 22/4633 280/806 |
| 2010/0176236 A1 * | 7/2010 | Clute | ................. | B60R 22/4628 242/389 |
| 2014/0084099 A1 * | 3/2014 | Miyoshi | ................. | B60R 22/46 242/374 |
| 2016/0114762 A1 * | 4/2016 | Landbeck | .......... | B60R 22/4633 242/374 |
| 2018/0265035 A1 * | 9/2018 | Kohlndorfer | ....... | B60R 22/4628 |
| 2020/0269805 A1 * | 8/2020 | Hall | ....................... | B60R 22/46 |
| 2021/0129790 A1 * | 5/2021 | Gray | .................. | B60R 22/4628 |

FOREIGN PATENT DOCUMENTS

CN              107757551 A   *  3/2018

\* cited by examiner

*Primary Examiner* — James A English
*Assistant Examiner* — Scott F. Underwood
(74) *Attorney, Agent, or Firm* — Dickinson Wright PLLC (57) ABSTRACT

A seatbelt pretensioner system for use in a seatbelt retractor assembly having a spindle and a frame includes a housing adapted for being mounted to the frame and having an interior cavity, a pretensioner tube having a first tube end in fluid communication with a gas generator and a second tube end in fluid communication with the interior cavity of the housing, a pinion being rotatably mounted in the housing and fixedly coupled to the spindle adapted for taking up seatbelt webbing during pretensioning, and a pretensioner rod disposed inside the pretensioner tube. Further, the pretensioner rod has a proximal end disposed towards the gas generator and a distal end disposed away from the gas generator. In addition, the housing is formed with at least two levels including an inboard portion and an outboard portion to store the pretensioner rod after pretensioning.

17 Claims, 10 Drawing Sheets

PRETENSIONER HOUSING IN RETRACTOR ASSEMBLY

TECHNICAL FIELD

This present disclosure relates generally to seatbelt restraint devices for restraining an occupant of a vehicle, and more particularly to devices for pretensioning an occupant restraint seatbelt.

BACKGROUND

The statements in this section merely provide background information related to the present disclosure and may not constitute prior art.

Seatbelt restraint systems for restraining an occupant in a vehicle seat play an important role in reducing occupant injury in vehicle crash situations. Seatbelt restraint systems of the conventional so-called "3-point" variety commonly have a lap belt section extending across the occupant's pelvis and a shoulder belt section crossing the upper torso, which are fastened together or are formed by a continuous length of seatbelt webbing. The lap and shoulder belt sections are connected to the vehicle structure by anchorages. A belt retractor is typically provided to store belt webbing and may further act to manage belt tension loads in a crash situation. Seatbelt restrain systems which are manually deployed by the occupant (so-called "active type") also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision or vehicle collision event.

OEM vehicle manufacturers often provide seatbelt restraint systems with pretensioning devices, which tension the seatbelt either during an impact of the vehicle or even prior to impact (also known as a "pre-pretensioner") to enhance occupant restraint performance. The pretensioner takes out slack in the webbing and permits the belt restraint system to couple with the occupant early in the crash sequence. One type of pretensioner acts on the webbing retractor to tension the belt. Various designs of retractor pretensioners presently exists, including a type known as a roto-pretensioner that incorporates a gas generator activated by a pyrotechnic charge. Generally, ignition of the pyrotechnic charge or other combustible material creates gas pressure in a chamber having a piston to impart motion upon a driving element such as a piston, rack and pinion, polymeric rod, or a series of ball elements disposed in a pretensioner tube, which engages with and wind a retractor spindle sprocket to retract the webbing.

Nowadays, since the vehicle technology is shifted towards highly autonomous vehicles, it is developed that the occupant seats are highly movable and configurable within the interior of the vehicle. In the autonomous vehicle, the occupant seats, which can rotate inside the vehicle drive a need for a seatbelt system that can be mounted to the vehicle seat. Accordingly, the seatbelt system in the autonomous vehicle need to be attached to the seat structure instead of the vehicle body for restraining an occupant sitting on the movable occupant seat. However, we have discovered that the conventional retractor assembly including a pretensioner system cannot be accommodated in a limited space of the seat structure to support the load of the occupant during an impact. The retractor assembly with the pretensioner system mounted to the seat structure should be compact and lightweight, and also support the same load as the conventional seatbelt system mounted to the vehicle body.

SUMMARY

The present disclosure relates to a seatbelt retractor assembly, especially suited for use in an autonomous vehicle (although additional applications are envisioned). The vehicle seats arranged in the interior of the autonomous vehicle are highly movable and configurable. Accordingly, the seatbelt retractor assembly is adapted for being mounted to a seat structure arranged in the interior of the vehicle such that the restraint system having the seatbelt retractor assembly for occupants can move together with the vehicle seat. Further, the seatbelt retractor assembly mounted to the seat structure includes a pretensioner system to tension the seatbelt in an early phase of a vehicle impact, and to maintain the retractor and the seatbelt webbing in a locked condition at the end of the pretensioning such that the seatbelt retractor assembly with the pretensioner system is compact and light-weight, and also supports the load of the occupant during a crash.

In accordance with an exemplary embodiment of the present disclosure, the seatbelt pretensioner system for use in a seatbelt retractor assembly having a spindle and a frame includes a housing adapted for being mounted to the frame, a pretensioner tube having a first tube end in fluid communication with a gas generator and a second tube end in fluid communication with the housing, a pinion having an annular body portion and a protrusion, and a pretensioner rod disposed inside the pretensioner tube and having a proximal end disposed towards the gas generator and a distal end disposed away from the gas generator. The pinion is rotatably mounted in the housing and fixedly coupled to the spindle adapted for taking up seatbelt webbing during pretensioning. Further, the housing includes an inboard portion having the annular body portion of the pinion and an outboard portion receiving the protrusion extending from the annular body portion such that the inboard portion and the outboard portion of the housing store the pretensioner rod after pretensioning.

In accordance with a further aspect of the present disclosure, the inboard portion of the housing includes a circular cavity receiving the annular body portion of the pinion and a guide plate attached to the frame of the retractor assembly. The housing includes an arcuate landing surface formed with a circular path around the circular cavity to guide the pretensioner rod exiting from the pretensioner tube. The inboard portion of the housing receives a portion of the pretensioner tube along the circular path.

In accordance with a further aspect of the present disclosure, the guide plate is disposed opposite an arcuate landing surface in the inboard portion of the housing and formed with a guide path having an inboard end and an outboard end. The guide plate includes a ramped surface formed along the guide path such that the rod moves toward the outboard portion of the housing along the ramped surface.

In accordance with a further aspect of the present disclosure, the outboard portion of the housing is formed with an overflow path to store a portion of the rod moving toward the outboard portion after pretensioning.

In accordance with a further aspect of the present disclosure, the second tube end of the pretensioner tube meets the first end of the arcuate landing surface formed in the housing, and the second end of the arcuate landing surface formed in the housing meets an inboard end of the guide plate disposed in the inboard portion of the housing. Due to the ramped surface of the guide plate disposed in the housing, an outboard end of the guide plate meets the overflow path disposed in the outboard portion of the housing.

In accordance with a further aspect of the present disclosure, after the pretensioner rod exits the pretensioner tube, the rod contacts an arcuate landing surface of the housing around the pinion in the inboard portion and is directed in a guide path having a ramped surface of the guide plate for moving toward the outboard portion such that the rod is stored in an interior cavity formed in at least two levels having the inboard and outboard portions of the housing after pretensioning.

In accordance with a further aspect of the present disclosure, the housing and the guide plate are each made from a casting material.

In accordance with another exemplary embodiment of the present disclosure, the seatbelt pretensioner system further includes a housing adapted for being mounted to the frame and having an interior cavity. The interior cavity of the housing is formed with at least two levels to store the pretensioner rod exiting from the pretensioner tube after pretensioning. The at least two levels of the interior cavity includes an inboard portion and an outboard portion such that the interior cavity of the housing is formed with a spiral shape.

Due to the limited space of the seat frame, the retractor assembly mounted to the seat frame is made with the components having the compact size. So, the seatbelt pretensioner system of the compact retractor assembly mounted to the occupant seat frame is not enough to store the pretensioner rod only in the plane of the pinion arranged in the pretensioner housing because, compared to the retractor assembly mounted to the vehicle body, the size of the compact retractor assembly is relatively reduced. Accordingly, the interior cavity of the housing in the pretensioner system need to be increased to store the pretensioner rod with the other ways such that the housing is formed with at least two levels (planes) along the rotational axis of the pinion, and stores the pretensioner rod in the interior cavity formed with a spiral or helical shape. According to the present disclosure, the compact retractor assembly can be accommodated in the limited space of the seat frame.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
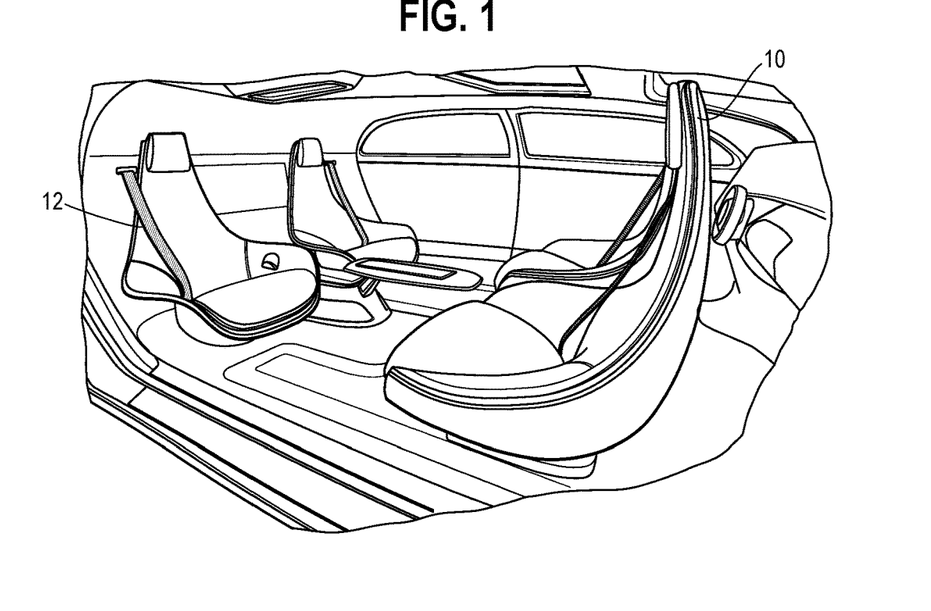
FIG. 1 shows vehicle seats arranged in an interior of a vehicle in accordance with an exemplary embodiment of the present disclosure.

Referring to the drawings, FIG. 1 shows a vehicle seat 10 in a vehicle interior, which is movable and also rotatable inside the vehicle interior. In particular, in the vehicle operated by an autonomous driving system (not shown), the vehicle seats 10 which are movable and also rotatable inside the vehicle. Accordingly, as shown in an example of FIG. 1, it is necessary for the movable vehicle seat 10 to have a seatbelt assembly 12 that is mounted to the seat structure such that the seatbelt assembly 12 is also able to move together with the vehicle seat 10 independently from the vehicle body.

Figure 2:
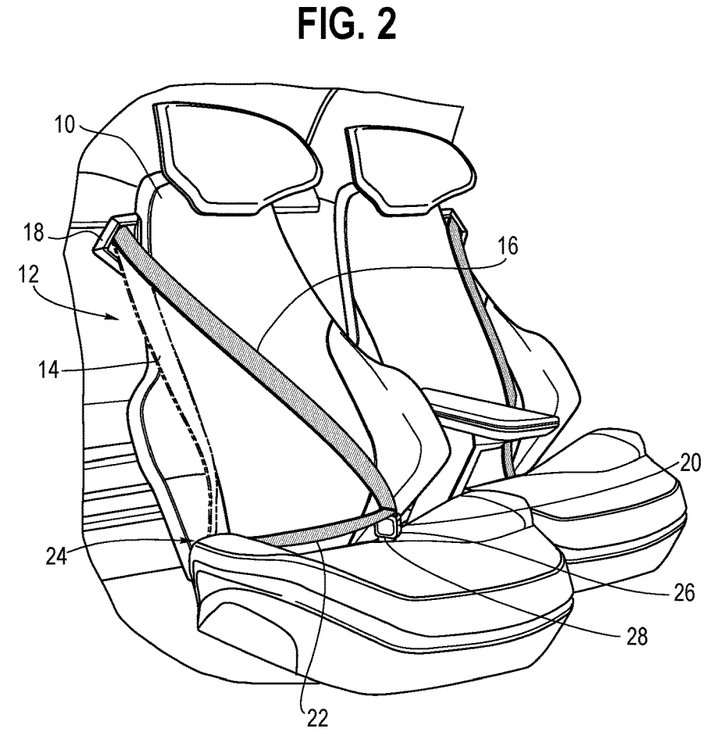
FIG. 2 is a perspective view of an occupant restraint system in the vehicle seat of FIG. 1.

FIG. 2 shows the vehicle seat 10 and the seatbelt assembly 12 in accordance with an exemplary embodiment. Generally, the seatbelt assembly 12 includes a seatbelt webbing 14 having a shoulder belt portion 16 extending from an upper guide loop or anchorage 18 to a latch plate 20 and a lap belt portion 22 extending from the latch plate 20 to a lower anchorage 24. The latch plate 20 is able to be inserted into a seatbelt buckle 26 to lock and unlock the seatbelt assembly 12. A seatbelt buckle cable 28, either directly or in cooperation with other components, secures a seatbelt buckle 26 to a portion of the seat structure (e.g., cushion frame of the vehicle seat 10). Accordingly, as shown in an example of FIG. 2, the seatbelt assembly 12 is attached to the structure of the vehicle seat 10 such that the seatbelt assembly 12 is moved together with the vehicle seat 10 (see FIG. 1).

The seatbelt webbing 14 is able to pay-out from a retractor assembly 100 (shown in FIG. 3), which is located within the vehicle seat 10. When the latch plate 20 has been fastened to the seatbelt buckle 26, the seatbelt assembly 12 defines a three-point restraint between the anchorage 18, the latch plate 20, and the lower anchorage 24 as shown in FIG. 2. All of the anchorages 18 and 24 including the seatbelt buck cable 28 are attached to the structure of the vehicle seat 10 according to the exemplary embodiment of FIG. 2. Further, any other suitable configuration of the seatbelt assembly 12 can be defined by attaching to the structure of the vehicle seat 10.

Figure 3:
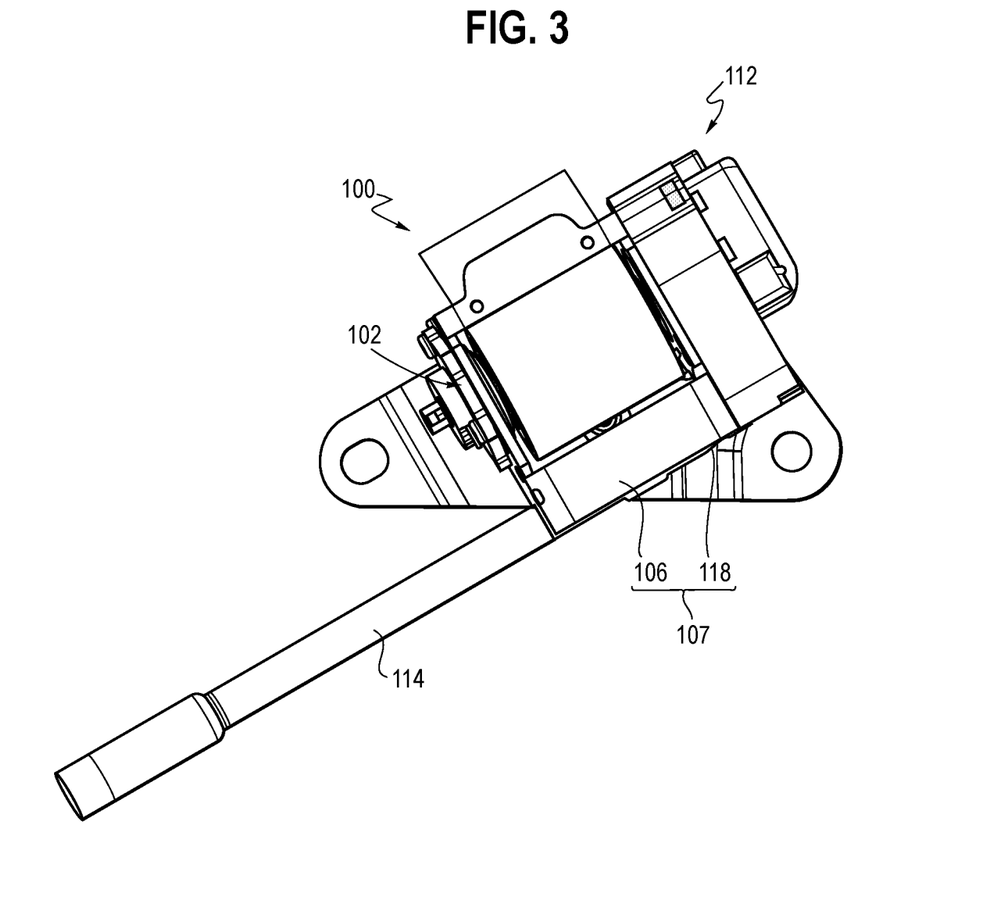
FIG. 3 is a perspective view of a seatbelt retractor assembly installed in the vehicle seat of FIG. 2.

In FIG. 3, the retractor assembly 100 having a pretensioning mechanism is designed to form with a compact size for installing in a limited place of the vehicle seat 10 such that the retractor assembly 100 is attached to the structure of the vehicle seat 10, for example, it may be enclosed within the hollow interior of a seat structure frame member. The retractor assembly 100 includes a spindle assembly 102 (see FIG. 4) and a gas generator 104 mounted to a frame assembly 107 having a frame 106 and an attachment bracket 118. The spindle assembly 102 (FIG. 4) is connected with and stows the seatbelt webbing 14 of the shoulder belt portion 16, whereas the end of the lap belt portion 22 is fixedly engaged with the anchorage point, for example, the frame assembly 107 or another portion of the vehicle seat 10. (See FIG. 2).

Figure 4:
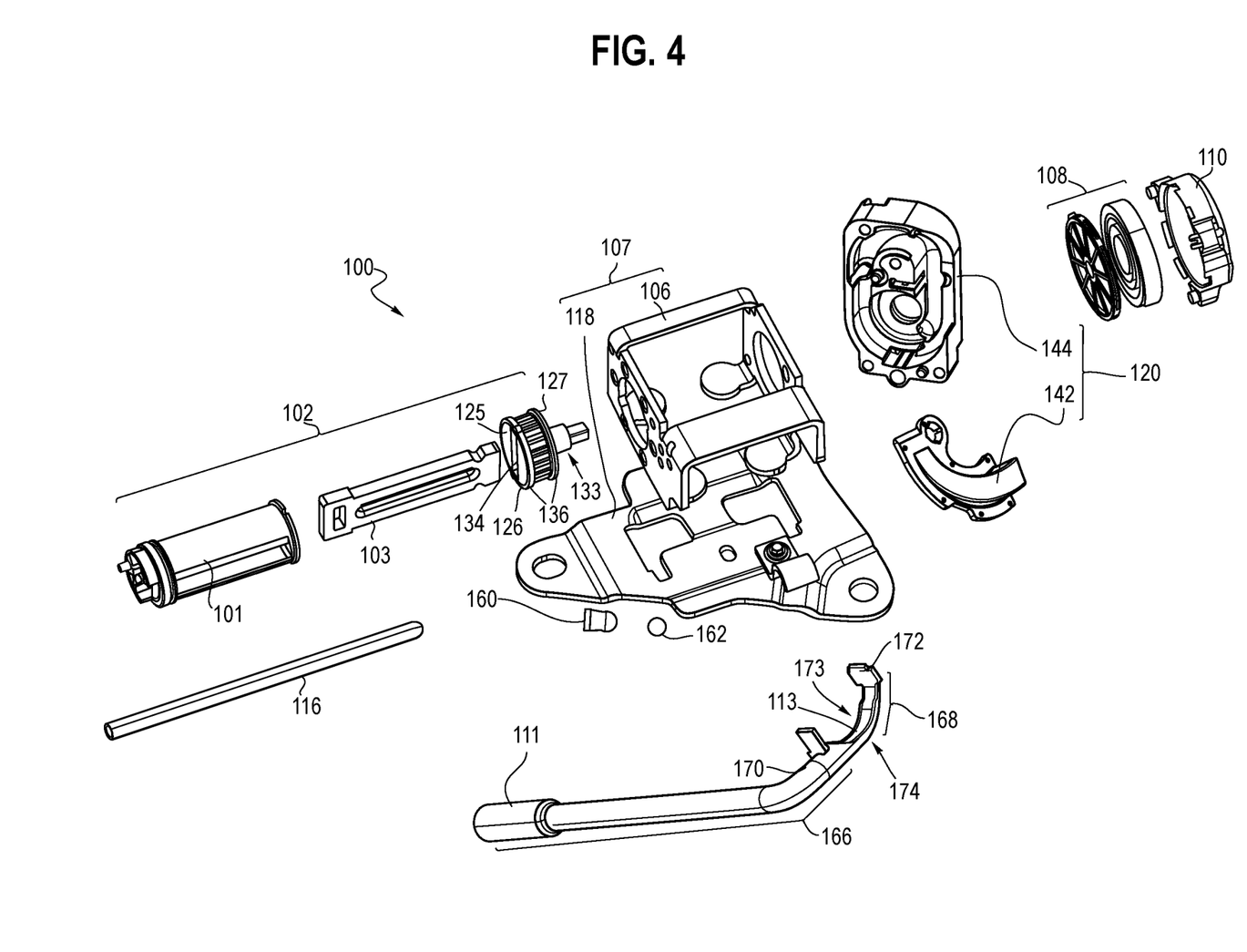
FIG. 4 is an exploded view of the seatbelt retractor assembly with a pretensioner system of FIG. 3.

Referring to FIG. 4, the spindle assembly 102 includes a spindle 101 and a spindle plate 103 placing inside the spindle 101 that engages the shoulder belt portion 16 of the seatbelt webbing 14 and rotates to wind-up or pay-out the seatbelt webbing 14. A torsional "clock" or "motor" type spring assembly 108 is carried within a spring end cap 110 and rotationally biases the spindle 101 to retract the seatbelt webbing 14. The spindle assembly 102 further incorporates other spindle control mechanisms that are known in accordance with the prior art, including a pretensioner (described further herein), inertia and webbing sensitive locking devices, torsion bar load limiters, or other belt control devices. Spindle control systems referred in this specification may include any system that controls the rotational movement of a webbing spindle, thus controlling the loading, extraction, and retraction of seatbelt webbing. One of the spindle control systems is a motor-assisted retractor. Spindle locking devices typically incorporate an inertia sensitive element, such as a rolling ball or pendulum, cooperating with a tread head and cause a pinion of the spindle to be engaged to prevent further withdrawing of the seatbelt webbing 14 and/or the connection of the latch plate 20 to the seatbelt buckle 26 from the spindle 101. Webbing sensitive locking devices sense rapid pay-out of the seatbelt webbing 14 to lock the retractor assembly 100. Various electronic sensing mechanisms that detect the withdrawal of the seatbelt webbing 14 and/or the connection of the latch plate 20 to the seatbelt buckle 26 may also be incorporated into the retractor assembly 100.

During normal operating of the associated vehicle, the retractor assembly 100 allows pay-out of the seatbelt webbing 14 to give the occupant a certain amount of freedom of movement. However, if an impact or a potential impact situation is detected, the retractor assembly 100 is locked to restrict pay-out and to secure the occupant in the vehicle seat 10. For example, if the vehicle deceleration at a predetermined rate or if the brakes are actuated with a predetermined force, then the retractor assembly 100 is locked. Due in part to the free pay-out of the seatbelt webbing 14, the seatbelt assembly 12 often develops slack during normal use.

In accordance with an exemplary embodiment of FIGS. 3 and 4, the retractor assembly 100 is formed in a compact manner for attaching to the structure of the vehicle seat 10. In particular, the retractor assembly 100 includes a pretensioner system 112 operatively connected to the spindle assembly 102 and operable to rotate the spindle 101 for pretensioning. As known to those of skill in the art, a retractor pretensioner winds seatbelt webbing into a more tight condition against the occupant at the initial stages of a detected vehicle impact. This is provided to reduce forward motion or excursion of the occupant in response to the deceleration forces of a vehicle impact or rollover.

As shown in FIGS. 3 and 4, the pretensioner system 112 includes a pretensioner tube 114 in communication with the gas generator 104. The gas generator 104 is used to provide expanding gas in response to a firing signal. As is known in the art, for example, the vehicle includes a sensor array sending a signal indicative of an emergency event such as an impact event, crash, or rollover. The vehicle sensor may be a specific impact sensor, or may be a traditional vehicle sensor (e.g., a longitudinal or lateral acceleration sensor) or otherwise part of a control system having a suite of multiple sensors. Any other impact sensor that is or will be known to those skilled in the art may also be readily employed in conjunction with the seatbelt assembly 12 of the present disclosure. An electronic control unit such as a central processing unit (CPU) or other controller receives a signal and controls the seatbelt assembly 12 to respond by tightening the seatbelt webbing 14 of the vehicle (e.g. via activation of a pretensioner).

As will be discussed in further detail below, the pretensioner tube 114 has a pretensioner rod 116, e.g., a plastically deformable polymer rod, disposed therein that has an elongate shape and is flexible within the tube 114. More specifically and as will be discussed in further detail below, the pretensioner rod 116, when disposed outside of the pretensioner tube 114 prior to insertion therein, has a generally a straight shape, and when inserted into the pretensioner tube 114, it will bend and flex in accordance with the bent shape of the pretensioner tube 114, which is fitted inside the limited space of the seat structure.

Further, in FIGS. 3 and 4, the retractor assembly 100 includes the spindle assembly 102 mounted to the frame 106 as described above. In particular, the spindle assembly 102 will rotate relative to the frame 106 to wind the seatbelt webbing 14 attached to the spindle assembly 102. The spindle assembly 102 includes a pinion 126 that is disposed within a housing 120 of the pretensioner system 112. The pinion 126 is attached to the spindle 101 and the rotation of the pinion 126 will cause the attached spindle 101 to rotate to wind the seatbelt webbing 14 that is attached to the spindle 101. Further, the housing 120 having the components of the pretensioner system 112 is attached to the frame 106.

Figure 5:
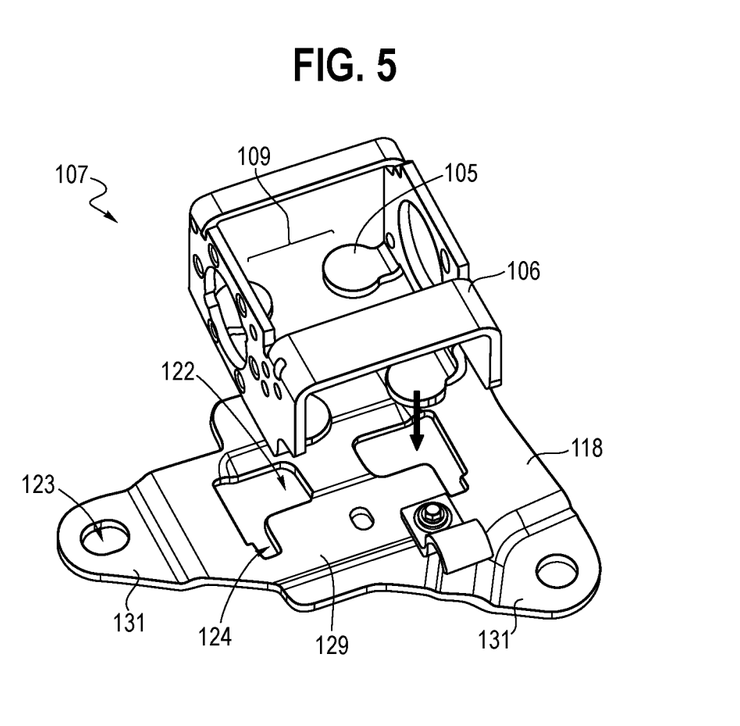
FIG. 5 is an exploded view of a frame assembly having a frame and an attachment bracket in the seatbelt retractor assembly of FIG. 3.
Figure 6:
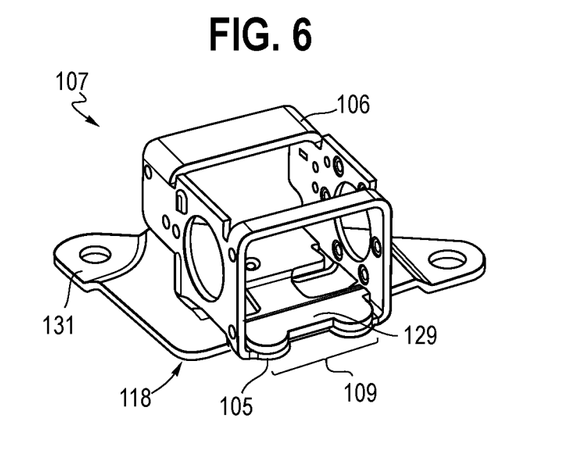
FIG. 6 is a perspective view of the frame assembly of FIG. 5.
Figure 7:
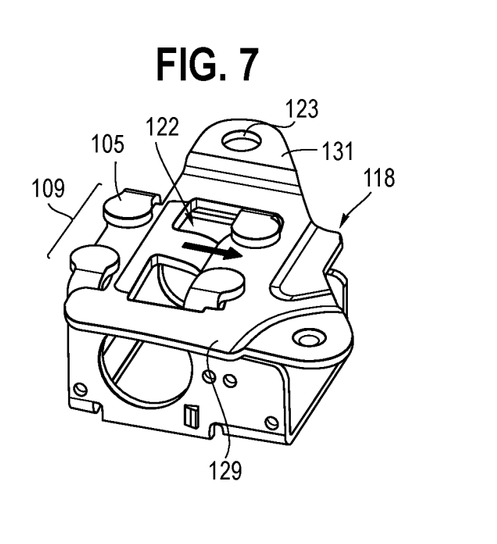
FIG. 7 is a perspective view of the other side of the frame assembly of FIG. 5.

Referring to FIGS. 5, 6, and 7, due to a limited space for mounting the retractor assembly 100 to the structure of the vehicle seat 10, the frame assembly 107 includes the frame 106 and the attachment bracket 118, which are interlocked to have an inner space receiving the spindle 101. In an exemplary form of FIGS. 5 and 6, the attachment bracket 118 is formed with a flat shape and includes a main portion 129 formed with at least one opening (aperture) 122 and at least one slot 124 to receive the frame 106 and a connection portion 131 formed with at least one hole 123 to attach the frame assembly 107 to the structure of the vehicle seat 10. The frame 106 is formed with a box shape and includes at least one pad 105 defining a base 109 in the frame 106 such that the base 109 of the frame 106 is attached to the main portion 129 of the attachment bracket 118. Further, the pad 105 formed as the base 109 of the frame 106 is inward bent such that the frame 106 is configured to reduce the packaging size for mounting the retractor assembly 100 to the limited space of the seat structure.

In FIGS. 5, 6, and 7, for example, the frame 106 is formed with four pads 105 slidably engaged with four slots 124 of the attachment bracket 118 such that the pads 105 of the frame 106 interlocks with the slot 124 of the attachment bracket 118. The openings 122 of the attachment bracket 118 facilitate the pads 105 to engage with the slots 124 of the attachment bracket 118. In FIG. 5, as the first step, the pads 105 pass through the opening 122 (that are inserted into the openings 122 of the bracket 118, see arrow), and in FIG. 7, as the second step, the pads 105 slide into the slots 124 (see arrow) to securely interlock with the slots 124 defined as the interlocked position where the frame 106 and the bracket 118 are structurally connected. Further, due to the inward bent pads 105, the pads 105 of the frame 106 overlaps the main portion 129 of the attachment bracket 118, and the pads 105 of the frame 106 are securely fixed to the attachment bracket 118 by a bonded manner (e.g., welding or riveting) such that the frame 105 reduces the footprint of the attachment bracket 118 and also increases mechanical strength of the frame assembly 107. Accordingly, the frame 106 is fixedly attached to the attachment bracket 118 such that the frame assembly 107 is formed as a single unit and supports the retractor assembly 100.

As shown in FIGS. 6 and 7, the frame assembly 107 having the frame 106 and the attachment bracket 118 is necessitated to not impact the packaging space of the retractor assembly 100 while keeping as much of a flat surface on the vertical walls of the frame 106 receiving the spindle assembly 102 and also the pretensioner system 112 as possible. Accordingly, the interaction of the pads 105 formed in the frame 106 and the slots 124 formed in the attachment bracket 118 is configured to increase the manufacturability of the retractor assembly 100 for arranging in the limited space of the seat structure.

Figure 8:
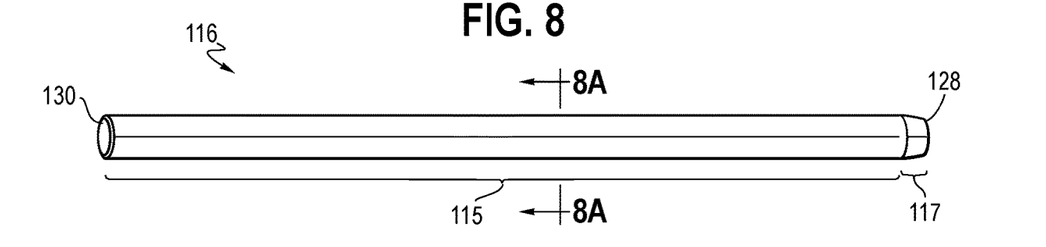
FIG. 8 is a plan view of a pretensioner rod in the pretensioner system of FIG. 4.

Referring back to FIGS. 3 and 4, the pretensioner rod 116 has a generally circular cross-section in one form (see also FIG. 8). In another approach, the pretensioner rod 116 could have a non-circular cross-section, such as a generally rectangular cross-section, a triangular cross-section, or other polygonal cross-section that allows the pretensioner rod 116 to be inserted into the pretensioner tube 114 and adapt to the bent (or arcuate) shape of the pretensioner tube 114 when inserted. For purpose of discussion, the pretensioner rod 116 will be discussed as having a generally circular cross-section. The circular cross-section could rotate along the length of the rod 116 to create a spiral shape in one approach.

Figure 8A:
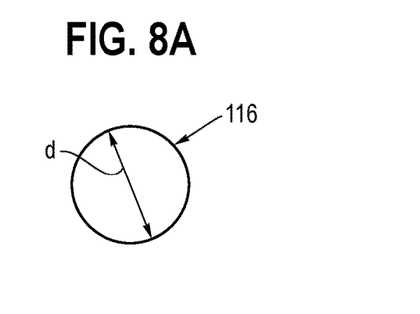
FIG. 8A is a cross-sectional view of the pretensioner rod, taken along line 8A-8A in FIG. 8.

FIGS. 8 and 8A show the pretensioner rod 116 having a generally circular cross-sectional shape. The rod 116 includes a main body portion 115 that extends along a majority of its overall length and a tapered portion 117 formed at its distal end 128. The rod 116 further includes a proximal end 130 that is disposed toward the gas generator 104 when the rod 116 is installed within the pretensioner system 112. Further, the distal end 128 of the rod 116 is disposed at the opposite end of the rod 116 from the proximal end 130. In addition, as shown in FIGS. 8 and 8A, the total length of the pretensioner rod is around 175 mm and the cross-sectional diameter d of the main body portion 115 in the pretensioner rod 116 is around 7.2 mm such that when inserted in the pretensioner tube 114, a radial gap between the rod 116 and the tube 114 is generally 0.15 mm in a body portion 166 of the tube 114. Because the main body portion 115 of the rod 116 and the tube 114 are close in size (a small radial gap) when inserted in the tube 114, the buckling of the rod 116 inside the tube 115 can be prevented.

The pretensioner rod 116 is preferably made from a polymer material, which can be selected to fit the particular desires of the user. The polymer material is preferably one that has sufficient flexibility such that it can bend and flex through the pretensioner tube 114 to allow for initial installation as well as in response to actuation by the gas generator 104. Moreover, the polymer material is selected to enable it to deform and structurally engage with the pretension or pinion during pretensioning operation. The polymer material is preferably one that has sufficient "pushability" (column loading characteristic) in response to actuation, such that the rod 116 will sufficiently transfer a load to the pinion 126 of the pretensioner system 112.

Further, the rod 116 is preferably made from a polymer material that is plastically deformable. During and after actuation, the rod 116 will be become plastically deformed in response to actuation and contact with other components of the pretensioner system 112 (for example, pinion vanes or guide plate). This plastic deformation will be further discussed below with reference to the use of the system 112, where the plastic deformation will cause the system to become locked to prevent or limit payback of the rod 116 without being completely dependent on maintained gas pressure in the pretensioner tube 114. In one approach, the rod 116 is made from a Nylon thermoplastic material. The rod 116 could also be made from an aliphatic polyamide thermoplastic material. In another approach, the rod 116 could be made from a similar thermoplastic material, such as an acetal material or polypropylene material. It will be appreciated, however, that other materials for the pretensioner rod 116 could also be used that can activate the pretensioner system 112 without plastic deformation. For example, an elastically deformable material could be used, but such a material would not provide each of the advantages of a plastically deformable rod.

Figure 9:
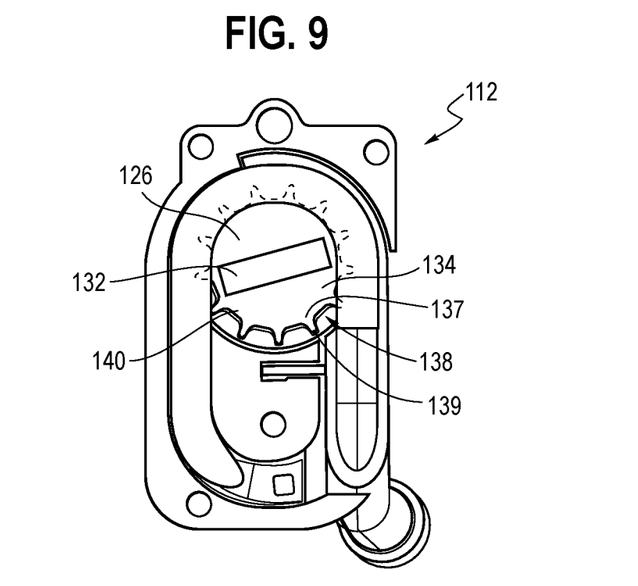
FIG. 9 is a cut-away view of the pretensioner system illustrating a pinion inside a housing of the pretensioner system of FIG. 4.
Figure 10:
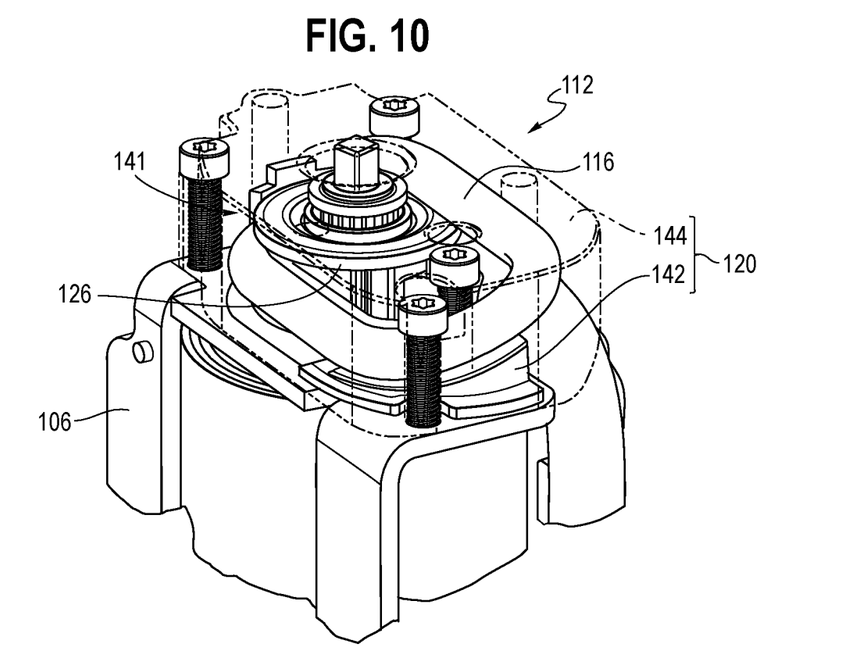
FIG. 10 is a perspective view of the pretensioner system having a pretensioner cup (transparent) and a guide plate arranged in the pretensioner system of FIG. 4.

Referring to FIGS. 9 and 10, the pinion 126 has a general annular shape that defines a central slot 132 receiving the spindle plate 103 at a first side 125 facing to the spindle 101 such that the central slot 132 is crimped to the spindle plate 103 (also see FIG. 4). Accordingly, the pinion 126 and the spindle 101 are connected each other by the spindle plate 103 such that the pinion 126 and the spindle 101 are coupled and rotate together. Further, the pinion 126 includes a protrusion 133 protruding from a second side 127 facing to the pretensioner system 112 such that the protrusion 133 is rotatably coupled to the housing 120 of the pretensioner system 112. As shown in FIGS. 9 and 10, the pinion 126 includes an annular body portion 134 and a flange portion 136 that projects radially from the base of the body portion 134. The pinion 126 further includes a plurality of vanes (or teeth) 138 that each project radially from the body portion 134 as well as longitudinally from the flange portion 136, such that the vanes 138 extend between the body portion 134 and the flange portion 138 (see FIG. 4).

As shown in FIG. 9, the vanes 138 each have a generally triangular shape when viewed from the front, with a base 137 that tapers into a point 139 as the vane 138 extends radially outward from the body portion 134. The particular width and pitch of the vanes 138 can be selected as desired. The plurality of vanes 138 combine to define cavities 140 that are disposed between adjacent vanes 138. In an exemplary embodiment of FIG. 9, the pinion 126 is formed with thirteen vanes 138 uniformly distributed, and each vane 138 can have the same size and shape. In another approach, the vanes 138 can have different sizes and/or be spaced at different intervals. Adjusting the size and spacing of the vanes 138 can alter the amount of rotation and/or the rate of the rotation for the pinion 126 and the interaction with the rod 116 when the pretensioner system 112 is activated.

Figures 11, 11A, 11B:
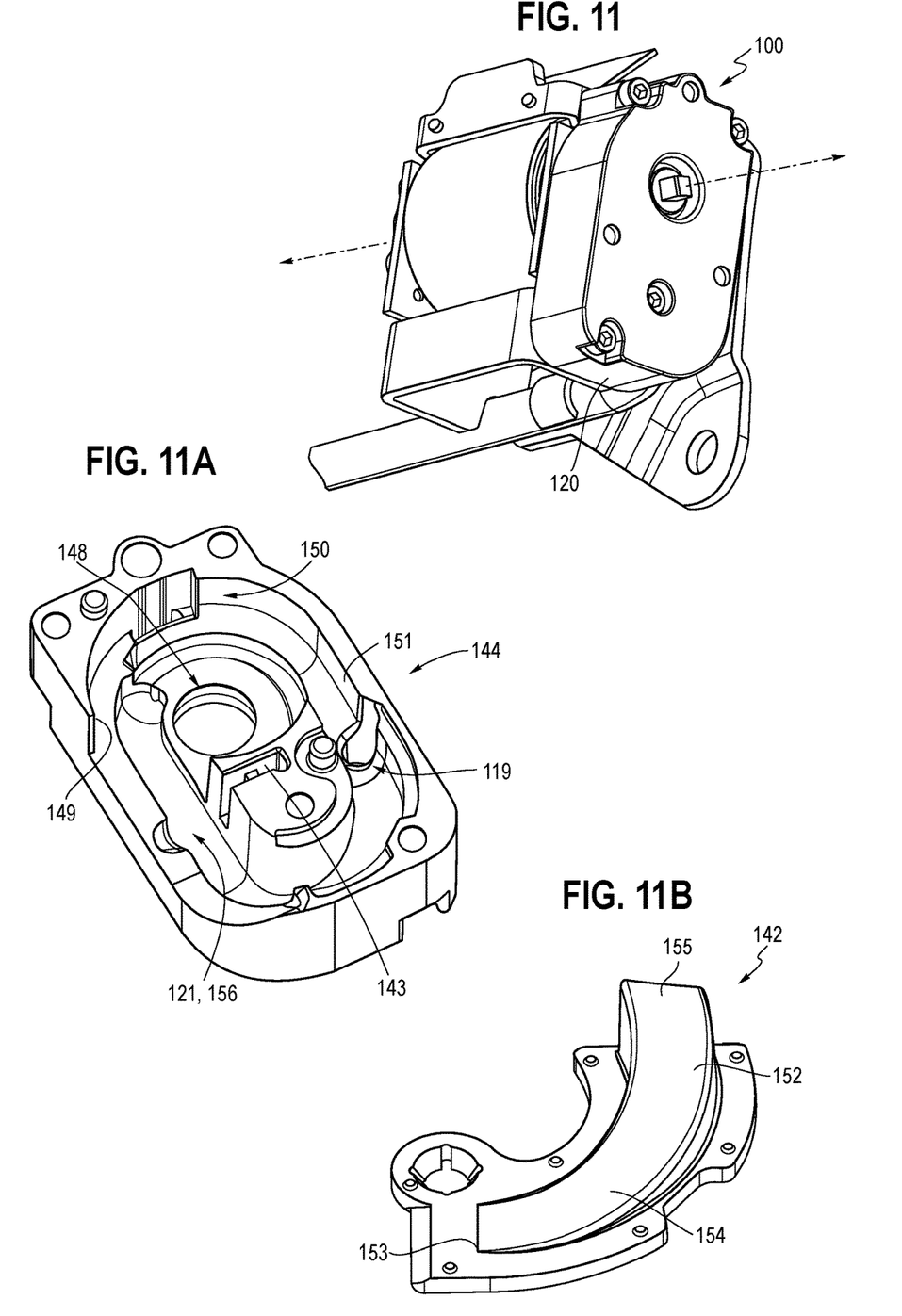
FIG. 11 is a perspective view of the seatbelt retractor assembly including the pretensioner system of FIG. 3.
FIG. 11A is a perspective view of a pretensioner cup of the pretensioner system of FIG. 3
FIG. 11B is a perspective view of a guide plate of the pretensioner system of FIG. 3.

Referring to FIG. 10, the housing 120 of the pretensioner system 112 (i.e., a pretensioner cup (PT cup)) is formed with an interior cavity 141 having a guide plate 142 and also is attached to the frame 106. As shown in FIG. 11, the housing 120 is formed with two layers having an inboard portion 119 which is close to the frame 106 and an outboard portion 121 which is located next to the inboard portion 119 such that the outboard portion 121 is arranged outward from the inboard portion 119 in the rotational axis of the pinion 126. The guide plate 142 is arranged in the inboard portion 119 of the housing 120, which also receives the annular body portion 134 of the pinion 126. Further, the PT cup 144 and the guide plate 142 are attached to the frame 106. The protrusion 133 of the pinion 126 is rotatably coupled to the outboard portion 121 of the housing 120 such that the pinion 126 attached to the spindle assembly 102 can rotate when needed.

In FIG. 11A, the PT cup 144 is formed with a circular cavity 148 to receive the pinion 126 and also formed with a circular path 146 for the rod 116 exiting from the tube 114 around the flange portion 136 of the pinion 126. Accordingly, the PT cup 144 is provided with the circular path 146 around the circular cavity 148 to guide the rod 116. The circular path 146 of the PT cup 144 is also formed with a generally arcuate landing surface 150 that has a concave shape toward the exit of the tube 114 around the circular cavity 148. In one approach, the arc of the surface 150 has a constant radius, and the center point of the radius of the arc is aligned with the rotational axis of the pinion 126 such that the radial spacing between the surface and the pinion is consistent along the length of the surface 150. In another approach, the center point of the radius of the surface could be offset from the rotational axis of the pinion 126 such that the radial spacing between the surface 150 and the outer diameter of the pinion 126 will vary at different points along the surface 150. Further, the arcuate landing surface 150 includes a first end 149 and a second end 151. The first end 149 is disposed opposite the exit of the tube 114 such that the rod 116 would engage the first end 149 prior to the second end 151 after exiting the tube 114. As shown in FIG. 11A, the PT cup 144 is generally made from cast metallic materials such as zinc or aluminum. However, in another approach, the PT cup 144 may be formed of other materials such as a stamping steel material, molded metallic material, or plastic material. Further, the PT cup 144 can be made by an injection molding process.

The housing 120 further includes the guide plate 142 disposed in the inboard portion 119. In FIG. 11B, the guide plate 142 is formed with a guide path 152 that is disposed opposite the arcuate landing surface 150 of the PT cup 144. Further, as shown in FIG. 10, the guide path 152 is formed with a ramped surface 154 such that the rod 116 moves toward the outboard portion 121 from the inboard portion 119. Due to the ramped surface 154 formed in the guide plate 142, the rod 116 is stored in the housing 120 having at least two levels such as the inboard portion 119 and the outboard portion 121 after pretensioning. Further, the guide path 152 includes an inboard end 153 and an outboard end 155. The inboard end 153 of the guide plate 142 meets the second end 151 of the arcuate landing surface 150 such that a portion of the rod 116 passing the pinion 126 moves toward the outboard portion 121 along the ramped surface 154 of the guide plate 142. In addition, the guide plate 142 is formed of cast metallic materials such as zinc or aluminum. In another approach, the guide plate 142 is formed of a plastic material by an injection molding process or a steel material by a stamping process.

Referring back to FIG. 11A, the PT cup 144 is further formed with an overflow path 156 to store the pretensioner rod 116. After pretensioning, the portion of the rod 116 passing the pinion 126 and the guide plate 142 in the inboard portion 119 is directed toward the overflow path 156 disposed in the outboard portion 121 of the housing 120. The overflow path 156 is sized and configured to allow the portion of the rod 116 to be received therein during actuation of the pretensioner system 112, if necessary. For example, in the inboard portion 119 of the housing 120 after the rod 116 exits the tube 114, it contacts the arcuate landing surface 150 of the PT cup 144 and be directed in the guide path 152 having the ramped surface 154 for moving to the outboard portion 121 such that the portion of the rod 116 is ultimately directed toward the overflow path 156.

Figure 12A:
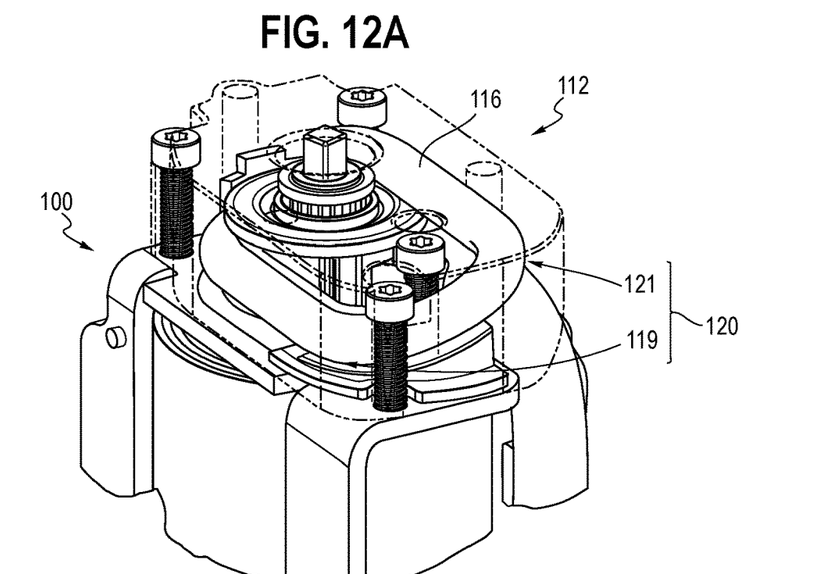
FIG. 12A is a perspective view of the retractor assembly illustrating the pretensioner rod stored in an interior cavity of the housing transparent in the pretensioner system after pretensioning in accordance with an exemplary embodiment of the present disclosure.
Figure 12B:
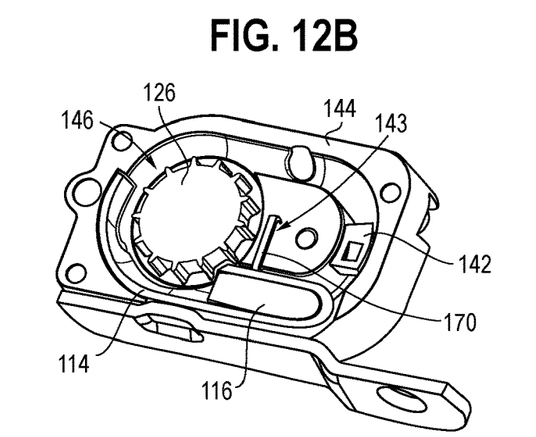
FIG. 12B is a cross-sectional end view of the pretensioner system before pretensioning in FIG. 12A.
Figure 12C:
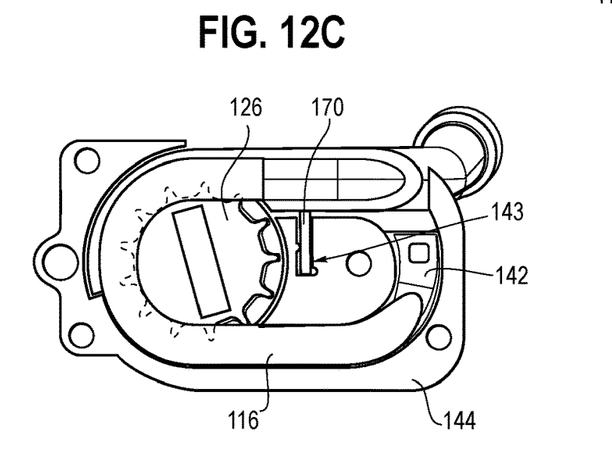
FIG. 12C is a cross-sectional end view of the pretensioner system after pretensioning in FIG. 12A.

Since the retractor assembly 100 according to the present disclosure is sized to fit within the limited space of the vehicle seat 10, compared to the conventional retractor assembly, the size of the retractor assembly 100 is generally compact and decreased. Accordingly, as shown in FIG. 12A, the housing 120 is formed with the inboard portion 119 and the outboard portion 121 such that the rod 116 is stored in both the inboard portion 119 and the outboard portion 121 after pretensioning. For example, the rod 116 is stored in the housing 120 formed as a helical or spiral storage because the inboard and outboard portion 119 and 121 are arranged side by side along the rotational axis of the pinion 126 such that the housing 120 is formed with two levels (planes) along the rotational axis of the pinion 126. The first level (plane) defined as the inboard portion 119 includes the body portion 134 of the pinion 126 and the second level (plane) defined as the outboard portion 121 includes the protrusion 133 of the pinion 126. Accordingly, the rod 116 is stored in two levels (planes) of the housing with a spiral or helical shape after pretensioning. FIGS. 12A-12C generally show the pretensioner rod 116 stored in the housing 120 of the pretensioner system 112 after pretensioning. FIG. 12A shows the compact retractor assembly 100 including the compact pretensioner system 112 according to the present disclosure. FIG. 12B is a cross-sectional end view showing the inside of the housing 120 of the pretensioner system 112 after pretensioning. In FIG. 12C, the rod 116 exiting the pretensioner tube 114 first contacts the pinion 126 and follows the arcuate shape inside the PT cup 144 in the inboard portion 119. After that, the rod 116 moves toward the outboard portion 121 from the inboard portion 119 via the guide path 152 of the guide plate 142 and then follows the overflow path 156 formed in the PT cup 144 such that the portion of the rod 116 is ultimately directed toward the outboard portion 121. Accordingly, the rod 116 is stored in both the inboard portion 119 and the outboard portion 121 of the housing 120 after pretensioning (see FIG. 12A).

Figure 13A:
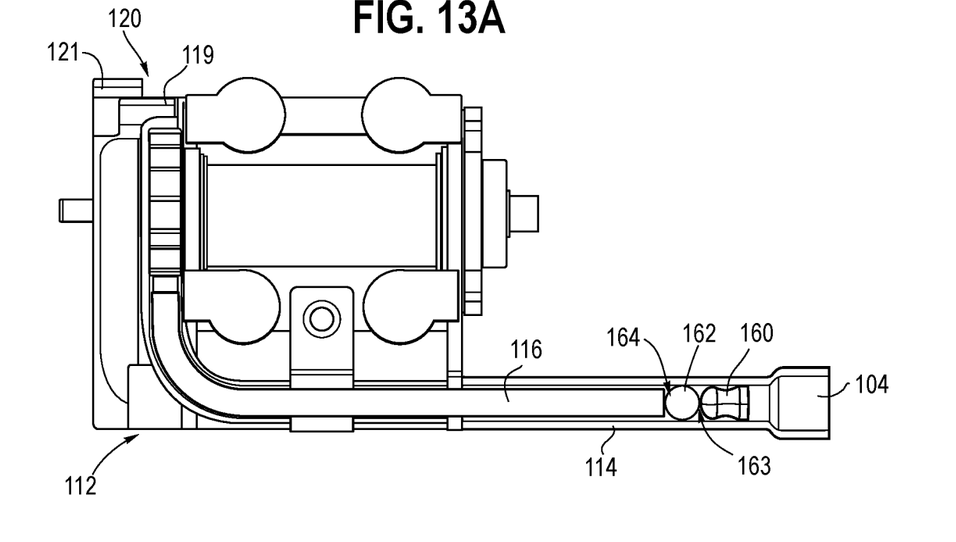
FIG. 13A is a plan view of the pretensioner rod disposed inside the pretensioner tube before actuating a gas generator in the seatbelt retractor assembly of FIG. 3.
Figure 13B:
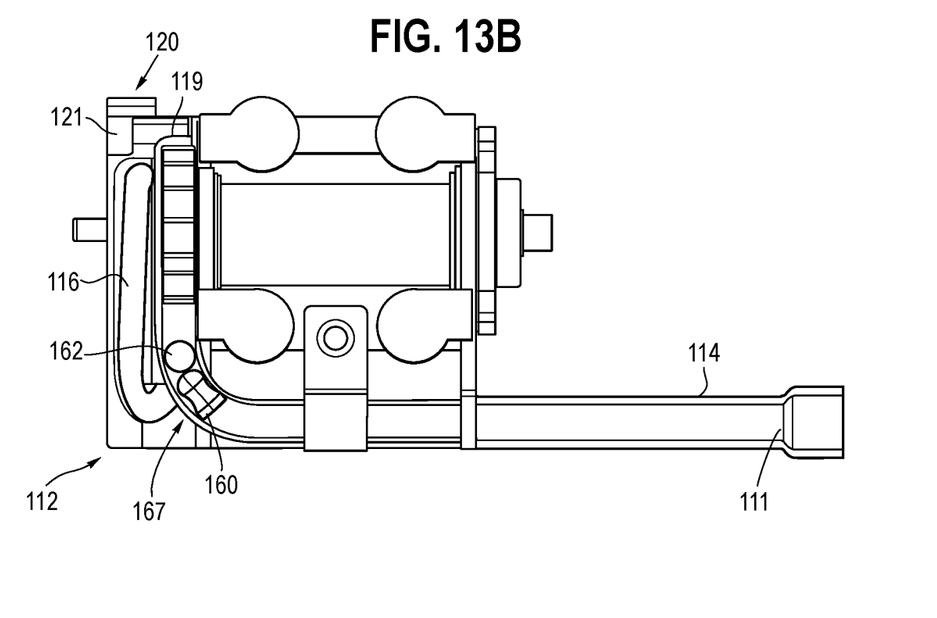
FIG. 13B is a plan view of the pretensioner rod disposed inside the housing after actuating the gas generator of FIG. 3.

As described above, the retractor assembly 100 includes the gas generator 104 (see FIG. 4) that provides expanding gas in response to a firing signal. FIG. 13A shows the pretensioner rod 116 with a seal 160 and a stopper 162 inside the pretensioner tube 114 before the gas generator is activated, and FIG. 13B shows the pretensioner rod 116 exiting the tube 114 after pretensioning. As shown in FIGS. 13A and 13B, the expanding gas causes an increase in pressure within the tube 114, which ultimately causes the rod 116 to be forced away from the gas generator 104 and through the tube 114. As described above, the pretensioner tube 114 further includes the piston or the seal 160. The seal 160 can have a cylindrical shape with a cylindrical outer surface in an approach (see FIG. 13C). In another approach, the seal can have a spherical shape with a spherical outer surface (not shown). The seal 160 is slidably disposed within the tube 114 and is operable to drive the rod 116 along the bent shape of the tube 114. As will be understood by those of skill in the art, the seal 160 may be press-fitted or otherwise fitted inside the tube 114.

Figure 13C:
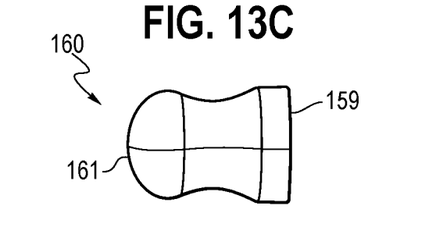
FIG. 13C is a plan view of a seal in the pretensioner system of FIG. 4.

As shown in FIGS. 13A and 13C, the seal 160 defines a proximal end 159 spaced from the gas generator 104 so as to define a gas chamber therebetween. The seal 160 defines a distal end 161 directed toward to the rod 116. Further, the pretensioner tube 114 includes the stopper 162 disposed within the tube 114 between the piston (seal) 160 and the rod 116. The stopper 162 is preferably made from a steel material, but could be made from another suitable material of sufficient strength (e.g., aluminum or reinforced plastic). The stopper 162 has a generally spherical shape in one approach. However, the stopper 162 could have an ovular shape or generally cylindrical shape in other approaches (not shown). The stopper 162 also defines a proximal end 163 that is adjacent the distal end 161 of the seal 160, and a distal end 164 that is adjacent the rod 116.

As shown in FIGS. 13A and 13B, the seal 160 and the stopper 162 are two separate and distinct components. In another approach, the stopper 162 could be integrated into the seal 160 such that they are fixed via an adhesive, welding, or mechanical connections, or are formed as a single unit (not shown). The seal 160 and stopper 162 cooperate to transfer the energy from the increased pressure in the gas chamber toward the rod 116. The seal 160 and stopper 162 are sized to cooperate in a coupled manner. In one approach, as shown in FIG. 13C, the proximal end 159 and the distal end 161 of the seal 160 having a cylindrical shape are each indented inward so as to define semi-spherical recesses or concave depressions. Also, the proximal end 163 of the stopper 162 has a convex shape to fit into the indented distal end 161 of the seal 160 such that the seal 160 and stopper 162 are securely coupled to each other. The rod 116, in order to travel through the tube 114 and flex according to the curvature of the tube 114, which is sized slightly smaller than the width of the tube 114. Thus, without the seal 160, gas from the gas generator 104 would flow past the rod 116 in the radial space defined between the rod 116 and the tube 114.

Figure 14:
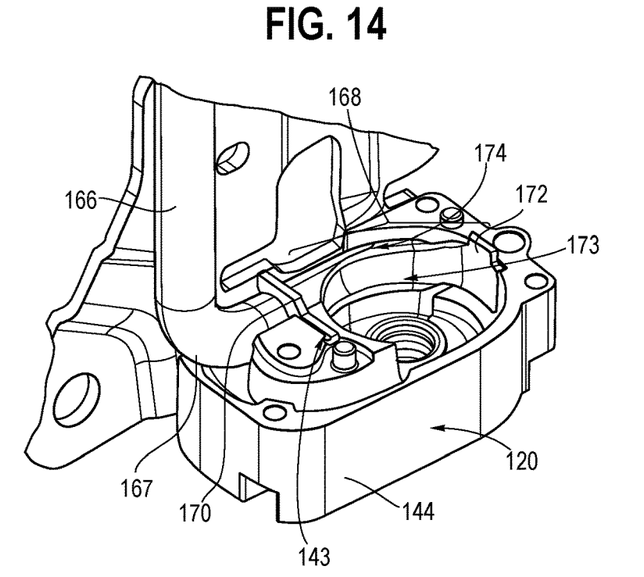
FIG. 14 is a perspective view of a pretensioner tube assembled with a pretensioner cup in accordance with an exemplary embodiment of the present disclosure.
Figure 14A:
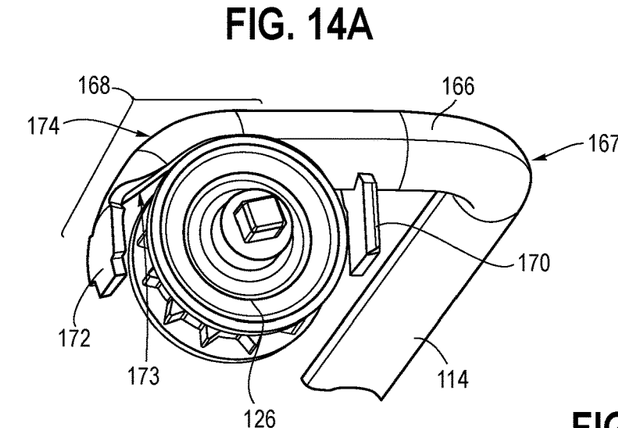
FIG. 14A is a perspective view of the pretensioner tube with the pinion of the pretensioner system of FIG. 4.
Figure 14B:
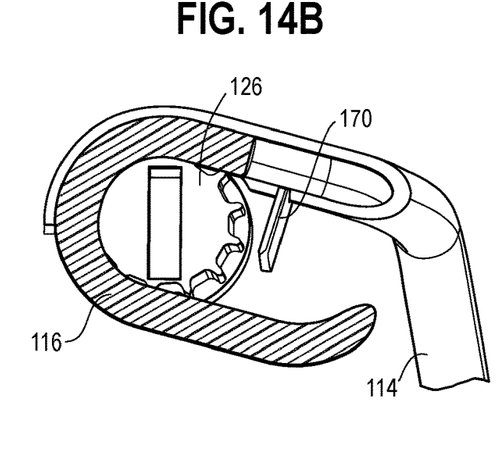
FIG. 14B is a cross-sectional end view of the pretensioner tube with the pinion of FIG. 14A.

Referring to FIGS. 14, 14A, and 14B, due to the compact size (smaller size) of the retractor assembly 100 for arranging in the limited space of the seat structure, the pretensioner tube 114 according to the present disclosure is formed to bend at the exit area of the tube 114 such that the pretensioner tube 114 includes a body portion 166 and an exit portion 168 defined in the exit area of the tube 114. Further, the pretensioner tube 114 includes a first tube end 111 in fluid communication with the gas generator 104 and a second tube end 113 in fluid communication with the interior cavity 141 of the housing 120. The second tube end 113 of the tube 114 extends toward the first end 149 of the arcuate landing surface 150 in the PT cup 144 such that the rod 116 exiting the tube 114 would engage with the pinion 126.

In FIGS. 4 and 14, the exit portion 168 of the pretensioner tube 114 extends from the second tube end 113 of the tube 114 such that the exit portion 168 of the tube 114 is placed inside the inboard portion 119 of the housing 120. Further, the pretensioner tube 114 is formed with a small ramp (not shown) at the second tube end 113 to prevent the stopper 162 from exiting the tube 114. As shown in FIGS. 14A and 14B, the exit portion 168 of the tube 114 partially wraps around the pinion 126 to minimize the space between the exit portion 168 of the tube 114 and the pinion 126 such that the rod 116 exiting the tube 114 is tightly engaged with the pinion 126. In the exit portion 168 of the tube 114, the tube 114 is formed with an opening side 173 faced to the pinion 126 and a cover side 174 contacting on the arcuate landing surface 150 in the PT cup 144 such that the cover side 174 of the exit portion 168 supports the rod 116 exiting the opening side 173 for the engagement with the pinion 126 (see FIGS. 14A and 14B). Due to the cover side 174 wrapping around the pinion 126 (see FIG. 14B), the space of the interior cavity 141 inside the housing 120 is reduced such that the deformation of the rod 116 is prevented during actuation of the pretensioner or the pretensioning of the seatbelt.

In addition, the pretensioner tube 114 further includes a mounting bracket 170 attached adjacent to the second tube end 113 to support the tube 114 during the pretensioning. The mounting bracket 170 welded to the outer surface of the tube 114 engages with a slot 143 formed in the PT cup 144. Further, the welded mounting bracket 170 also engages with the frame 106 when the pretensioner system 112 is attached to the frame assembly 107 such that the pretensioner tube 114 is secured and also supported during actuation of the pretensioner or the pretensioning of the seatbelt. Furthermore, the exit portion 168 of the tube 114 includes a T-tab 172 formed in an end of the exit portion 168, which is located in a middle portion between the first end 149 and the second end 151 of the arcuate landing surface 150. As shown in FIGS. 14 and 14A, the T-tab 172 also engages with the frame 106 and the housing 120 when the pretensioner system 112 is assembled with the frame assembly 107 such that the pretensioner tube 114 is secured and supported during pretensioning.

In an approach, as shown in an example of FIGS. 13A and 13B, when the spherical stopper 162 is used inside the tube 114 formed with the small ramp, the spherical stopper 162 is prevented from exiting the tube 114. In another approach, when the stopper having a cylindrical shape is used, the length of the cylindrical stopper should be very short in order to pass the arc-shaped area 167 of the tube 114 because the tube 114 is sharply bent as shown in FIG. 14B. For example, the cylindrical stopper (not shown) is only 3-4 mm long, and also is formed with multiple detents for facilitating the cylindrical stopper to pass through the arc-shaped area 167 of the tube 114.

During actuation of a pretensioner and during pretensioning of the seatbelt there can be a side-effect known as payback, where the tension on the seatbelt from caused by the occupant during an event triggering pretensioning can rotate the spindle in a direction opposite the pretensioning rotation. This rotation is transferred to the pinion and driving element, causing the driving elements to travel in the reverse direction within the tube. Payback can be counteracted by maintaining pressure in the pretensioner tube, but this requires the gas generator to fire for a longer period and additional propellant.

However, a preferred embodiment of the pretensioner system 112 described herein includes features configured to counteract the above described payback side-effect as an alternative to or in addition to maintained gas pressure. As described above, the rod 116 is preferably made of a plastically deformable material, such as a polymer. Referring back to FIGS. 12A, 12B, and 12C, during actuation of the pretensioner system 112, the rod 116 exits the tube 114 and contacts the vanes 138 of the pinion 126, causing the pinion 126 to rotate. As the rod 116 continues past the pinion 126 causing it to rotate, additional ones of vanes 138 will contact the side of the rod 116, causing the rod to be compressed and deformed plastically in the area of interference between the vanes 138 and the rod 116. This compression will also cause the rod 116 to be compressed against the PT cup 144, creating a press-fit configuration of the rod 116 between the pinion 126 and the PT cup 144. Further, the plastic deformation of the rod 116 caused by the vanes 138 will prevent or substantially limit the pinion 126 from rotating in the opposite direction, thereby preventing or substantially limiting payback.

Having described the various above embodiments, the general functionality of the pretensioner system 112 will now be described. The pretensioner system 112 has a first, initial, or nominal state, in which the rod 116 is preferably positioned within the tube 114 adjacent the seal 160 and the stopper 162 as shown in FIG. 13A. The seal 160 and stopper 162 are positioned upstream of the rod 116, with the stopper 164 disposed between the seal 160 and the rod 116. The gas generator 104 is attached to the end of the tube 114 so that the gas chamber is defined between the gas generator 104 and the seal 160.

In response to an event or signal that actuates pretensioning, the gas generator 104 will expel gas into the gas chamber. The increased pressure within the chamber will force the seal 160, stopper 162, and rod 116 away from the gas generator 104 and along the path defined by the tube 114. The tapered portion (distal end) 117 of the rod 116 will translate toward the pinion 126, ultimately contacting one of the vanes 138 of the pinion 126 and subsequently a plurality of the vanes 138. The force from the rod 116 exerted against the vane 138 will cause the pinion 126 to rotate about its rotational axis, thereby ultimately winding the seatbelt webbing 14 around the spindle 101 relative to its initial, nominal position. Of course, there are intermediate positions between the first and second positions.

The proximal end of the rod 116 is initially positioned adjacent the seal 160 and the stopper 162 as shown in FIG. 13A. In response to actuation of the gas generator 104, the force of the seal 160 and the stopper 162 is transferred to the rod 116. This force will cause the proximal end of the rod 116 to be partially deformed in response, and also the rod 116 travels through the tube 114 during actuation. Further, the rod 116 will continue being driven, such that it is directed in an arcuate path corresponding to the landing surface 150 of the PT cup 144, and further the rod 116 moves toward the outboard portion 121 from the inboard portion 119 via the guide path 152 corresponding to the ramped surface 154 of the guide plate 142. The rod 116 will continue to rotate the pinion 126 as it translates along the arcuate landing surface 150 of the PT cup 144. The distal end of the rod 116 will ultimately travel into the overflow path 156 formed in the outboard portion 121 of the housing 120 as shown in FIG. 13B. The pinion 126 will continue to be driven by the engagement between the main body portion 115 of the rod 116 and the pinion 126. With the rod 116 partially disengaged with the pinion 126, the rod 116 is in a locked position (see FIG. 12A). While in the locked position, the rod 116 is prevented from moving in the reverse direction because the rod 116 is engaged with the vanes 138 of the pinion 126.

During actuation, the seal 160 and stopper 162 will also travel along the tube 114, and the travel of these components assist in driving the rod 116 through the tube 114. In the locked position of the rod 116, the seal 160 and stopper 162 will experience backpressure from the rod 116 as it undergoes resistance contacting the pinion 126. Thus, the seal 160 will have a circumferentially expanded state in the locked position of the rod 116. Further, in instances where the rod 116 travels along the path far enough, the seal 160 and stopper 162 will continue to travel through the tube 114 toward the exit portion 168. Accordingly, due to the stopper 162 having a larger diameter than the inner diameter of the tube end 113, the stopper 162 (also with the seal 160) is prevented from passing through the exit portion 168 of the tube 114 as shown in FIG. 13B.

While the above description constitutes the preferred embodiments of the present invention, it will be appreciated that the invention is susceptible to modification, variation and change without departing from the proper scope and fair meaning of the accompanying claims.

What is claimed is:

1. A seatbelt pretensioner system for use in a seatbelt pretensioning retractor assembly having a spindle and a frame, the seatbelt pretensioner system comprising:
   a housing adapted for being mounted to the frame;
   a pretensioner tube having a first tube end in fluid communication with a gas generator and a second tube end in fluid communication with the housing;
   a pinion having an annular body portion and a protrusion extending longitudinally from the annular body portion along a rotational axis of the pinion, the pinion being rotatably mounted in the housing and fixedly coupled to the spindle adapted for taking up seatbelt webbing during pretensioning; and
   a pretensioner rod disposed inside the pretensioner tube, the pretensioner rod having a proximal end disposed towards the gas generator and a distal end disposed away from the gas generator,
   wherein the housing includes an inboard portion having the annular body portion of the pinion and an outboard portion receiving the protrusion extending from the annular body portion such that the inboard portion and the outboard portion of the housing are arranged side by side along the rotational axis of the pinion to store the pretensioner rod after pretensioning.

2. The seatbelt pretensioner system of claim 1, wherein the inboard portion of the housing includes a circular cavity receiving the annular body portion of the pinion and a guide plate attached to the frame of the retractor assembly.

3. The seatbelt pretensioner system of claim 2, wherein the housing includes an arcuate landing surface formed with a circular path around the circular cavity to guide the pretensioner rod exiting from the pretensioner tube.

4. The seatbelt pretensioner system of claim 3, wherein the inboard portion of the housing receives a portion of the pretensioner tube along the circular path.

5. The seatbelt pretensioner system of claim 3, wherein the second tube end of the pretensioner tube meets a first end of an arcuate landing surface formed in the housing, and a second end of the arcuate landing surface formed in the housing meets an inboard end of the guide plate disposed in the inboard portion of the housing.

6. The seatbelt pretensioner system of claim 2, wherein the guide plate is disposed opposite an arcuate landing surface in the inboard portion of the housing and formed with a guide path having an inboard end and an outboard end.

7. The seatbelt pretensioner system of claim 6, wherein the guide plate includes a ramped surface formed along the guide path such that the rod moves toward the outboard portion of the housing along the ramped surface.

8. The seatbelt pretensioner system of claim 6, wherein due to the ramped surface of the guide plate disposed in the housing, an outboard end of the guide plate meets an overflow path disposed in the outboard portion of the housing.

9. The seatbelt pretensioner system of claim 2, the guide plate and the housing are each made from a casting material.

10. The seatbelt pretensioner system of claim 1, wherein the outboard portion of the housing is formed with an overflow path to store a portion of the rod moving toward the outboard portion after pretensioning.

11. The seatbelt pretensioner system of claim 1, wherein after the pretensioner rod exits the pretensioner tube, the rod contacts an arcuate landing surface of the housing around the pinion in the inboard portion and is directed in a guide path having a ramped surface of the guide plate for moving toward the outboard portion such that the rod is stored in an interior cavity formed in at least two levels having the inboard and outboard portions of the housing after pretensioning.

12. A seatbelt pretensioner system for use in a seatbelt pretensioning retractor assembly having a spindle and a frame, the seatbelt pretensioner system comprising:

a housing adapted for being mounted to the frame and having an interior cavity;

a pretensioner tube having a first tube end in fluid communication with a gas generator and a second tube end in fluid communication with the interior cavity of the housing;

a pinion being rotatably mounted in the housing and fixedly coupled to the spindle adapted for taking up seatbelt webbing during pretensioning; and a pretensioner rod disposed inside the pretensioner tube, the pretensioner rod having a proximal end disposed towards the gas generator and a distal end disposed away from the gas generator, wherein the interior cavity of the housing is formed with at least two levels arranged side by side along a rotational axis of the pinion to store the pretensioner rod after pretensioning.

13. The seatbelt pretensioner system of claim 12, wherein the at least two levels of the interior cavity include an inboard portion and an outboard portion such that the interior cavity of the housing is formed with a spiral shape.

14. The seatbelt pretensioner system of claim 13, wherein the inboard portion includes a circular path formed around the pinion and a guide plate having a guide path such that a portion of the pretensioner rod is stored in the circular path and the guide path after pretensioning.

15. The seatbelt pretensioner system of claim 14, wherein the guide path of the guide plate is formed with a ramped surface to move the pretensioner rod exiting from the tube toward the outboard portion from the inboard portion after pretensioning.

16. The seatbelt pretensioner system of claim 13, wherein the outboard portion includes an overflow path storing a portion of the pretensioner rod.

17. The seatbelt pretensioner system of claim 13, wherein an annular body portion of the pinion arranged in the inboard portion of the housing and a protrusion extending from the annular body portion is rotatably engaged with the outboard portion of the housing.

* * * * *